(12) United States Patent
Hardee et al.

(10) Patent No.: US 10,043,020 B2
(45) Date of Patent: Aug. 7, 2018

(54) FILE FILTER

(71) Applicant: International Business Machines Corporation, Armonk, NY (US)

(72) Inventors: Christopher J. Hardee, Raleigh, NC (US); Jason A. Matteson, Raleigh, NC (US); Mark E. Steinke, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/974,762

(22) Filed: Dec. 18, 2015

(65) Prior Publication Data
US 2017/0177885 A1    Jun. 22, 2017

(51) Int. Cl.
| | | |
|---|---|---|
| *G06F 21/00* | (2013.01) | |
| *G06F 21/62* | (2013.01) | |
| *G06F 21/60* | (2013.01) | |
| *G06F 17/30* | (2006.01) | |
| *H04L 29/06* | (2006.01) | |
| *H04L 29/08* | (2006.01) | |

(52) U.S. Cl.
CPC .... *G06F 21/6209* (2013.01); *G06F 17/30115* (2013.01); *G06F 21/606* (2013.01); *H04L 63/04* (2013.01); *H04L 63/20* (2013.01); *H04L 67/06* (2013.01)

(58) Field of Classification Search
CPC ........... G06F 21/6209; G06F 17/30115; G06F 21/606; H04L 67/06; H04L 63/20; H04L 63/04
See application file for complete search history.

(56) References Cited

U.S. PATENT DOCUMENTS

| | | | |
|---|---|---|---|
| 6,208,436 B1 * | 3/2001 | Cunningham | H04N 1/00371 358/474 |
| 7,272,857 B1 | 9/2007 | Everhart | |
| 7,546,334 B2 | 6/2009 | Redlich et al. | |
| 8,726,396 B1 * | 5/2014 | Dodke | G06F 21/6209 726/1 |
| 2007/0266421 A1 * | 11/2007 | Vaidya | H04L 63/20 726/1 |
| 2007/0282951 A1 * | 12/2007 | Selimis | H04L 67/06 709/205 |
| 2011/0277013 A1 | 11/2011 | Chinta | |

(Continued)

OTHER PUBLICATIONS

List of IBM Patents or Patent Applications Treated as Related.
(Continued)

*Primary Examiner* — Mahfuzur Rahman
(74) *Attorney, Agent, or Firm* — Patterson + Sheridan, LLP (57) ABSTRACT

Method for transferring files to a destination folder on a computer. At least one rule to a transfer of files to a destination folder on a destination computer system are received. A filter file is generated, wherein the filter file includes the least one rule specific to the transfer of files to the destination folder. During transfer of files to the destination folder on the destination computer, attributes of each file are compared to the at least one rule specific to the transfer of files to the destination folder. Upon attributes of a compared file violating a rule of the at least one rule specific to the transfer of files to the destination folder, transfer of the violating file to the destination folder is prevented.

8 Claims, 6 Drawing Sheets

(56) References Cited

U.S. PATENT DOCUMENTS

| | | | |
|---|---|---|---|
| 2012/0204227 A1* | 8/2012 | Fiducci | H04L 63/083 |
| | | | 726/3 |
| 2013/0246592 A1* | 9/2013 | Gartside | H04L 63/145 |
| | | | 709/223 |
| 2016/0080397 A1* | 3/2016 | Bacastow | H04L 63/1408 |
| | | | 726/1 |
| 2017/0214700 A1* | 7/2017 | Bacastow | H04L 63/1408 |

OTHER PUBLICATIONS

Hu, H-Y et al: "Design of Directory Security Control System Based on File System Filter Driver", INSPEC/IEEE, 2008.
Gramlich, W. et al: "File System Filters: Easily Add Functionality to File Systems", IP.com, Aug. 9, 2002.
Anonymous: "Folder Redirect and Filtering", IP.com, Sep. 21, 2010.

* cited by examiner

FILE FILTER

BACKGROUND

The present invention relates to electronic file transfers, and more specifically, to providing permission filters that ensure only approved files are transferred to a destination directory.

Currently, it is possible to inadvertently move or copy unwanted or inappropriate files. As an example, an engineer installing files on a customer's computer system may unknowingly include inappropriate files from a source computer while copying an entire tools folder to a Universal Serial Bus (USB) memory device. Those inappropriate files could then be downloaded from the USB device to the customer's computer system. The loading of such inappropriate files onto the customer's computer system could result in a security breach.

SUMMARY

According to one embodiment of the present invention, a computer-implemented method comprises receiving a request to transfer files from a source to a destination folder on a destination computer. The computer-implemented method also comprises accessing a filter file that includes at least one file transfer rule. The computer-implemented method also comprises, responsive to the request, comparing attributes of each file to the at least one file transfer rule. The computer-implemented method also comprises preventing transfer of the violating file to the destination folder upon attributes of a compared file violating the at least one rule specific to the transfer of files to the destination folder.

According to one embodiment of the present invention, a system comprises a computer processor. The system also comprises an input operable to receive computer-readable files and computer-readable folders. The system also comprises a computer memory containing a destination folder for at least one computer-readable computer file and a program that, when executed on the computer processor, performs an operation for processing data, comprising receiving a computer-readable filter file that includes at least one rule specific to the transfer of files to the destination folder. The operation also comprises comparing attributes each file to the at least one rule specific to the transfer of files to the destination folder during transfer of files to the destination folder from the input. The operation also comprises preventing transfer of the violating file to the destination folder upon attributes of a compared file violating a rule of the at least one rule specific to the transfer of files to the destination folder.

According to one embodiment of the present invention, a computer program product for transferring computer files to a destination folder comprises a computer-readable storage medium having computer-readable program code embodied therewith. The computer-readable program code is executable by one or more computer processors to compare attributes of each file to the at least one rule specific to the transfer of files to the destination folder during transfer of files to a destination folder on a destination computer. The computer-readable code is also executable to prevent transfer of the violating file to the destination folder upon attributes of a compared file violating a rule of the at least one rule specific to the transfer of files to the destination folder.

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As discussed above, in some circumstances, a batch of files needs to be transferred to a computer. For example, a technician may load certain computer files into a destination folder of the destination computer for a software and/or system update. Typically, the technician could copy the files to the destination folder from a portable storage device (e.g., a USB memory stick or like device) on which the files are stored. In other circumstances, the technician could download the files from a remote storage device accessible via a computer network (e.g., the Internet). In either circumstance (or other circumstances), the technician could inadvertently transfer inappropriate files to the destination computer.

In various embodiments described herein, a filter file can be created and installed on a destination computer for files. The filter file includes rules that files must satisfy to be transferred to the destination computer (e.g., to a destination folder on the destination computer). An application running on the destination computer can check files to be transferred to the destination computer against the filter file. In the event that a particular file or attributes of the particular file do not satisfy the rules of the filter file, then the application prevents transfer of the particular file to the destination computer.

Figure 1:
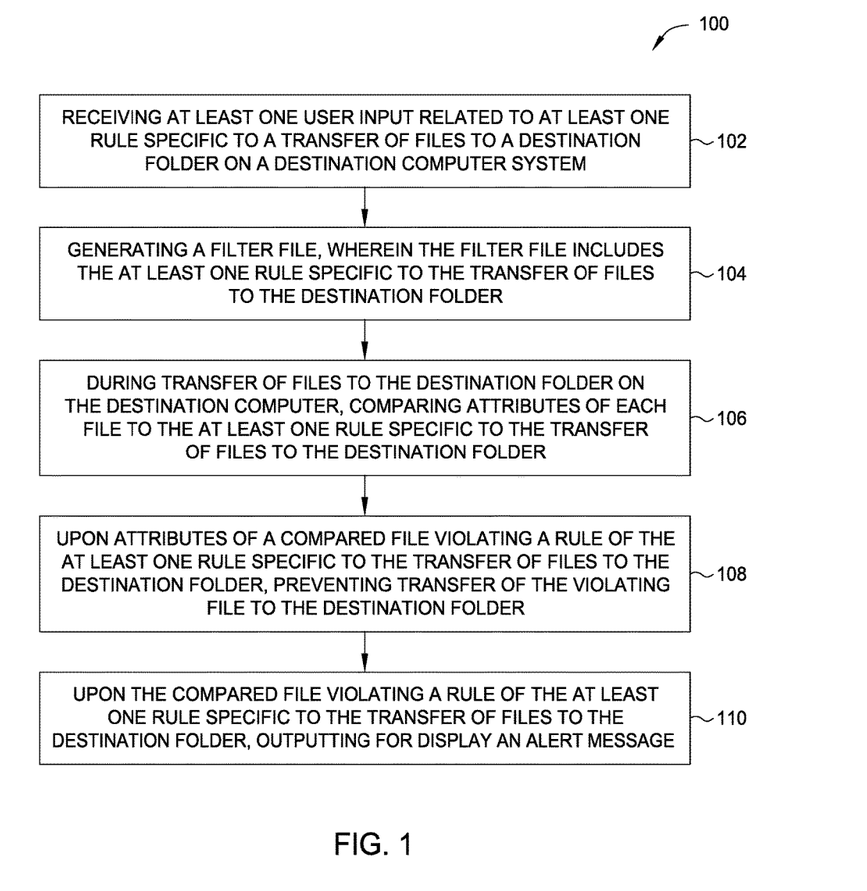
FIG. 1 is a flow chart of a process for transferring files in accordance with rules in a filter file.

FIG. 1 illustrates a process 100 for transferring files to a destination folder of the destination computer in accordance with rules stored in a filter file. In block 102, at least one user input related to one or more rules specific to a transfer of files to a destination folder is received. As described in greater detail below with reference to FIGS. 5 and 6, a user may enter rules into a graphical user interface or by other means. In block 104, a filter file is generated that includes the rules that were entered by the user in block 102. In block 106, before files are transferred to the destination folder on the destination computer, attributes of the files are compared to the rules stored in the filter file. For example, the filter file could be stored on the destination computer and, in some embodiments, in the destination folder. An application running on the destination computer could check each of the files to be transferred against the filter file. As another example, the filter file could be stored on the portable memory storing the files to be transferred, and an application running on the destination computer could check each of the files to be transferred against the filter file. For example, the destination computer could execute an application program stored on the destination computer and/or on the portable memory to check the files to be transferred against the filter file. In block 108, upon one of the files to be transferred to the destination folder violating a rule in the filter file, transfer of that file to the destination folder is blocked or prevented. In block 110, an alert message is output to notify the user that a file is not transferred. In addition to the alert, some embodiments could present the user with a prompt that indicates the nature of the violation (e.g., the rule(s) that were violated by a particular file). The prompt may also provide the user with options. For example, the prompt could enable the user to continue with the file transfer despite the rule violation. As another example, the prompt could enable the user to confirm that the file is not to be transferred. As yet another option, the prompt could enable the user to abort the entire file transfer process. In such an occurrence, files that have already been transferred could be erased.

Figure 2:
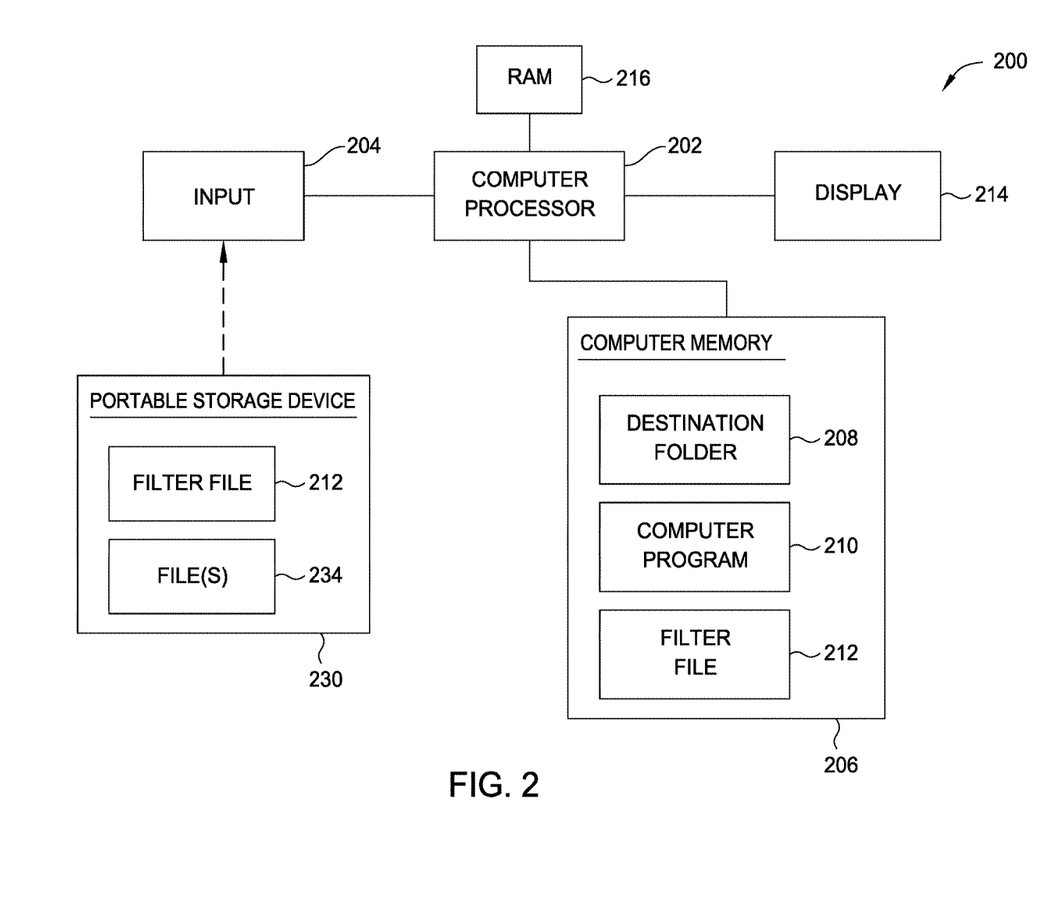
FIG. 2 is a block diagram of a system for transferring files in accordance with rules in a filter file.

FIG. 2 illustrates a system 200 according to at least one embodiment for transferring files to a destination folder on a destination computer. The system 200 includes a computer processor 202 in communication with a computer memory 206. The computer memory 206 includes a destination folder 208. The computer memory 206 also includes a computer program 210 or application that is executable by the computer processor 202 to check files to be transferred to the destination folder 208 against a filter file 212 that is also stored in the computer memory 206. The system 200 can also include a display 214 in communication with the computer processor 202 that can display alert messages output by the computer processor 202, as discussed above with reference to block 110 of the process 100. The system 200 also includes an input 204 that can be connected to a portable storage device and/or a remote storage device. For example, in certain embodiments, the input 204 could be a USB connection, an optical disk reader (e.g., a CD-ROM, DVD-ROM, or Blu-ray reader), or a memory card reader. As another example, in certain embodiments, the input 204 could be an Ethernet connection that can communicate over a computer network (e.g., over the Internet or over a local area network).

A portable storage device 230 that stores the files to be transferred to the destination folder 208 can be connected to and/or be in communication with the input 204 of the system 200. For example, the portable device 230 could be a USB memory stick, a CD-ROM, DVD-ROM, or Blu-ray disc, or a memory card. As another example, the portable device 230 could be a remote computer communicating with the input 204 over an Ethernet connection. The portable storage device 230 includes the files 234 to be transferred to the destination folder 208. Optionally, the portable storage device 230 could also include a copy of the filter file 212.

When the portable storage device 230 is connected to the system 200 via the input 204, the computer program 210 can be executed by the processor 202 to check the files 234 against the filter file 212 before downloading the files 234 to the destination folder 208. For example, the computer program 210 could check attributes of the files 234 stored on the portable storage device 230 against the filter file 212. In the event the files 234 do not violate any of the rules in the filter file 212, the files 234 are copied from the portable storage device 230 and the copies of the files 234 are placed in the destination folder 208. As another example, a temporary copy of the files 234 could be loaded into random access memory (RAM) 216 of the system 200, and the computer program 210 executed by the computer processor 202 could check the temporary copy of the files 234 loaded into RAM 216. In the event the files 234 do not violate any of the rules in the filter file 212, the files 234 are transferred from RAM 216 to the destination folder 208.

As discussed above, the portable storage device 230 can include a copy of the filter file 212. In various embodiments, the computer processor 202 could compare the copy of the filter file 212 stored in the portable storage device 230 with a copy of the filter file 212 stored in computer memory 206. For example, in at least one embodiment, the computer processor 202 could perform a checksum operation to ensure that the copies of the filter files 212 on the portable storage device 230 and on the computer memory 206 are identical. If the copies of the filter files 212 are identical, then the computer program 210 begins to check the files 234 against the filter file 212 and copy/transfer the files 234 to the destination computer 208 if the files 234 do not violate the rules of the filter file 224, in accordance with the process 100 described above with reference to FIG. 1.

Figure 3:
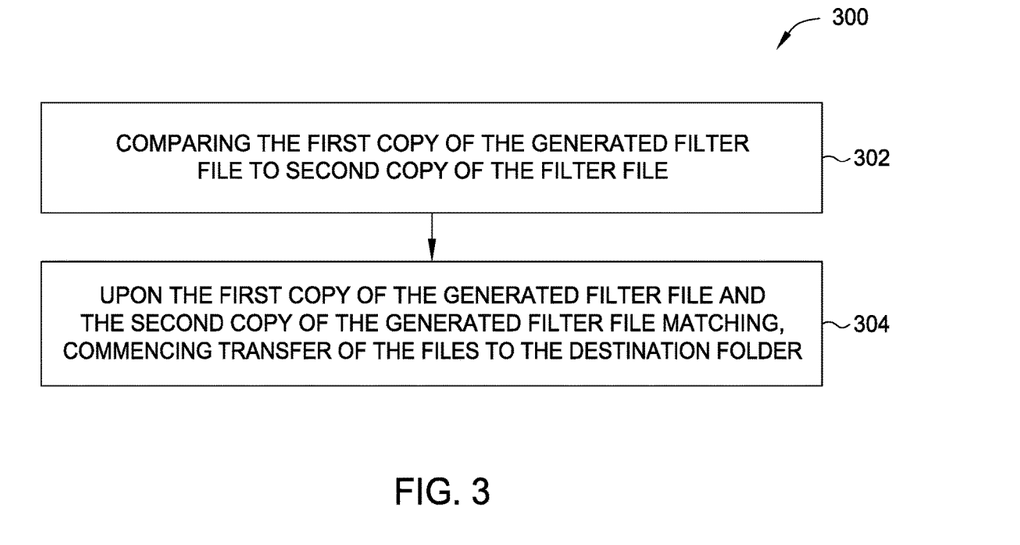
FIG. 3 is a flow chart of an optional process for comparing copies of filter files in a destination and with files to be transferred, and transferring the files in accordance with rules in the filter file if the filter files match.

In instances in which a copy of the filter file 212 is included in the computer memory 206 and a copy is included on the portable storage device 230, the copies of the filter file 212 can be compared to ensure they are identical. Such a comparison could further increase the security of the transfer of the files to the computer memory 206. FIG. 3 illustrates a process 300 for checking the copies of the filter files on the portable storage device 230 and computer memory 206. In block 302, a first copy of the filter file (e.g., the copy of the filter file 212 stored on the portable storage device 230) is compared to a second copy of the filter file (e.g., the copy of the filter file 212 stored in computer memory 206). For example, the processor 202 could perform a checksum operation to ensure that the copies of the filter file 212 are identical. In block 304, upon the first copy of the generated filter file on the second copy of the filter file matching, transfer the files to the destination folder 208 commences in accordance with the process 100 described above with reference to FIG. 1.

Figure 4:
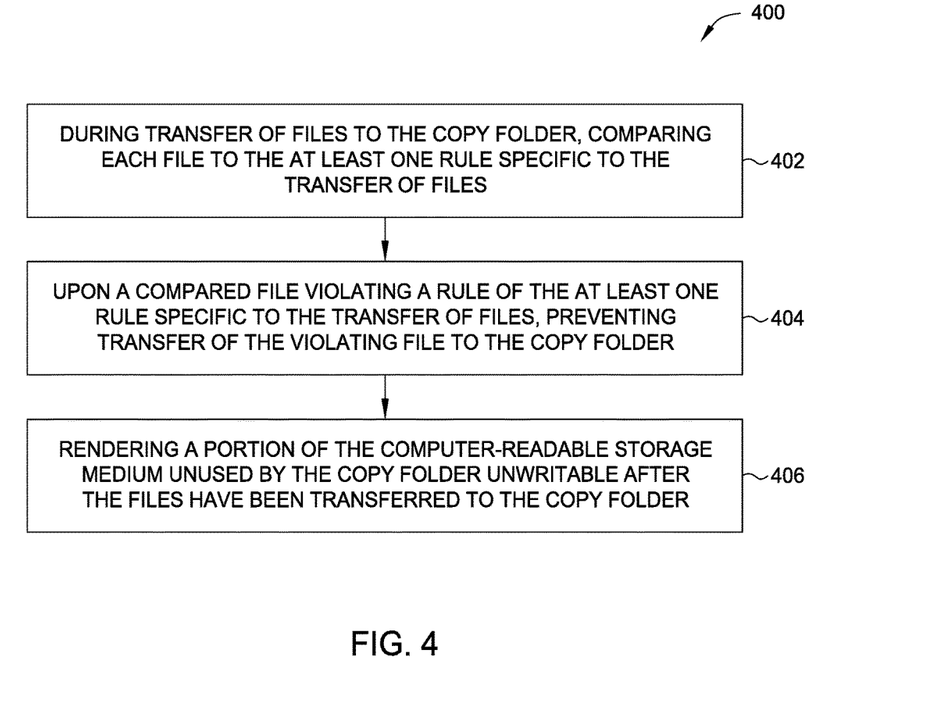
FIG. 4 is a flow chart for transferring files to a portable device in accordance with rules in the filter file.

In various aspects, an additional layer of protection against inadvertent transfer of inappropriate files can be provided by checking the files 234 against the filter file 212 before the files are placed on the portable storage device 230. FIG. 4 illustrates a process 400 for checking the files 234 against the filter file 212 before transferring the files 234 to the portable storage device 230. For example, the files 234 to be transferred to the destination folder 208 may originate on a different computer. A copy of the computer program 210 that checks the files 234 against the filter file 212 could also reside on the different computer, while a copy of the filter file 212 resides on the portable storage device 230. In block 402, when a technician transfers the files 234 to the portable storage device 230, the computer program 210 on the different computer can check the files 234 against the copy of the filter file 212 on the portable storage device 230. In block 404, upon a particular one of the files 234 violating a rule in the filter file 212, the computer program 210 prevents transfer of that particular file from the different computer to the portable storage device 230. Referring to block 406, as an additional layer of protection, after the files 234 have been transferred to the portable storage device 230, the computer program 210 running on the other computer could optionally partition or otherwise block any remaining space on the portable storage device 230 so that additional files cannot be transferred to the portable storage device 230.

Figure 5:
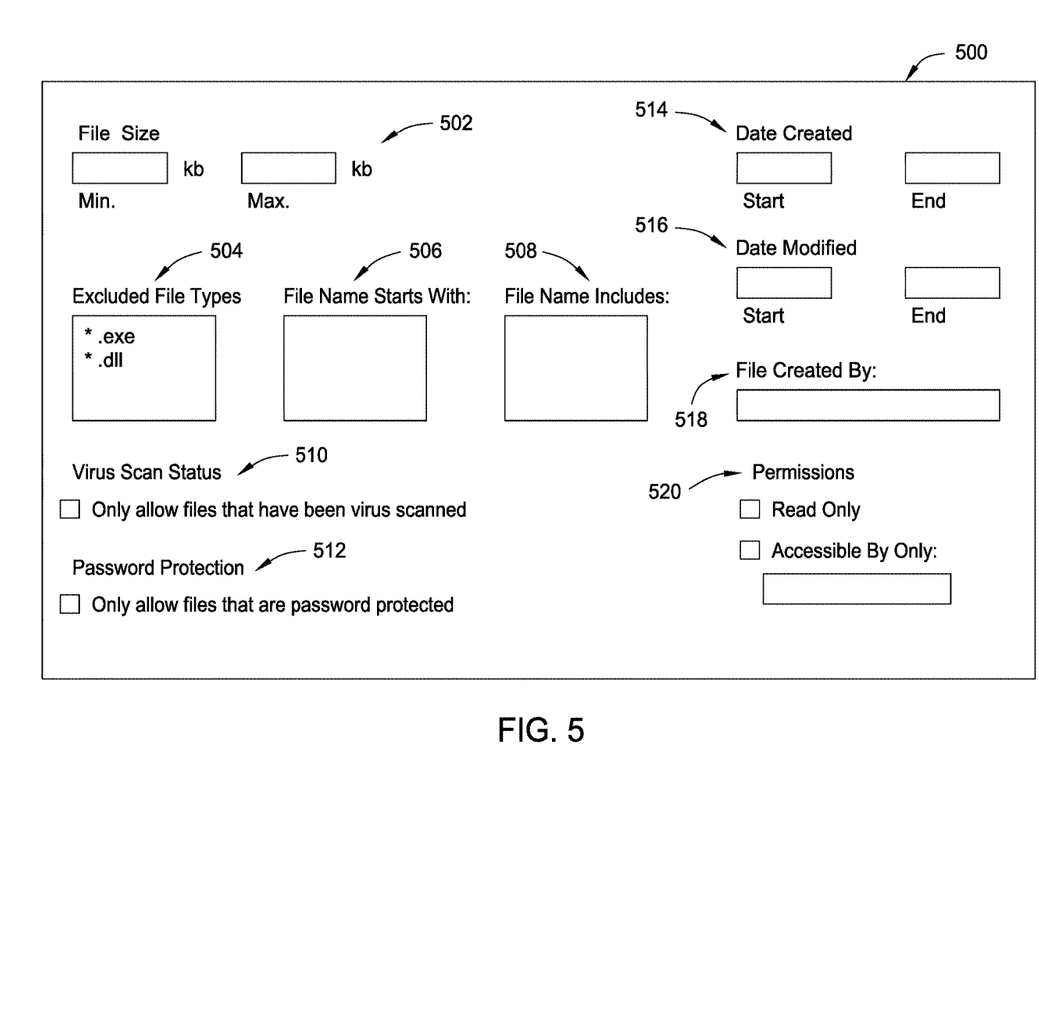
FIG. 5 is an illustration of an exemplary graphical user interface for a user to input rules to be included in a generated filter file.

FIG. 5 illustrates an exemplary graphical user interface 500 that a user, such as a technician, could use to provide inputs to create rules for a filter file. In general, the interface 500 allows a user to specify negative or positive file attributes. A negative file attribute is an attribute which a file may not have in order to qualify for transfer, while a positive file attribute is one which a file must have in order to qualify for transfer. Illustratively, the exemplary graphical user interface 500 includes a file size field 502 in which a user can specify minimum and maximum file sizes for files to be transferred. In various embodiments, a user could enter minimum and/or maximum file sizes. In various other embodiments, the user could select minimum and/or maximum file sizes from drop-down menus, for example. In the event a user selects a minimum and/or maximum file size in the file size field 502, a generated filter file (e.g., the filter file 212) will include a rule that defines a minimum and/or maximum file size for files that can be transferred to a destination folder (e.g., the destination folder 208). In the event a group of files for transfer to the destination folder includes a particular file having a size that is larger than a maximum file size specified by the rule or smaller than a minimum file size specified by the rule, the filter file 212 and application (e.g., the computer program 210) performing the file transfer would prevent the particular file from being transferred. For example, the files for transfer could include metadata that indicates a file size, and the application could evaluate the metadata for the files to identify files that are larger than a specified maximum file size and/or smaller than a specified minimum file size. The application could exclude from the transfer files that are not compliant with the specified sizes.

The exemplary graphical user interface 500 includes an excluded file types field in which a user can specify file types that are not to be transferred. FIG. 5 illustrates the file type field 504 as including .exe files and .dll files as examples. Again, in various embodiments, a user could enter file types. In various other embodiments, the user could select file types from drop-down menus, for example. In the event a user selects a file type in the file type field 504, a generated filter file (e.g., the filter file 212) will include a rule that identifies file types that will not be transferred to a destination folder (e.g., the destination folder 208). In the event a group of files for transfer to the destination folder includes a particular file having a type that is excluded by the rule, the filter file 212 and application (e.g., the computer program 210) performing the file transfer would prevent the particular file from being transferred.

The exemplary graphical user interface 500 also includes a "file name starts with" field 506 and a "file name includes" field 508. In various circumstances, a technician or other user could identify a group of files that are part of a transfer by using a common naming convention for the files. For example, the technician could begin each filename with a common identifier, such as "PROJECTALPHA." The technician could use the "file name starts with" field 506 to limit files that are transferred to those that begin with "PROJECTALPHA." As another example, the technician could include his initials in the name of each file to be transferred. The technician could use the "file name includes" field 508 to limit files that are transferred to those that include his initials. In the event a user inputs a file name beginning in the "file name starts with" field 506, a generated filter file (e.g., the filter file 212) will include a rule that only allows files that begin with the specified file name beginning to be transferred to a destination folder (e.g., the destination folder 208). In the event a group of files for transfer to the destination folder includes a particular file does not include the file name beginning specified by the rule, the filter file 212 and application (e.g., the computer program 210) performing the file transfer would prevent the particular file from being transferred. In the event a user inputs a file name portion in the "file name includes" field 508, a generated filter file (e.g., the filter file 212) will include a rule that only allows files that include the specified file name portion to be transferred to a destination folder (e.g., the destination folder 208). In the event a group of files for transfer to the destination folder includes a particular file does not include the file name portion specified by the rule, the filter file 212 and application (e.g., the computer program 210) performing the file transfer would prevent the particular file from being transferred.

The exemplary graphical user interface 500 also includes a virus scan status field 510 and a password protection field 512 that each include a selectable radio button. The virus scan status field 510 could be selected such that only files that have been virus scanned can be transferred. Similarly, the password protection field 512 could be selected such that only files that have password protection can be transferred. In the event a user selects the radio button for the virus scan status field 510, a generated filter file (e.g., the filter file 212) will include a rule that only allows files that have been virus scanned to be transferred to a destination folder (e.g., the destination folder 208). In the event a group of files for transfer to the destination folder includes a particular file that has not been virus scanned as specified by the rule, the filter file 212 and application (e.g., the computer program 210) performing the file transfer would prevent the particular file from being transferred. For example, the files for transfer could include metadata that indicates a virus scan status, and the application could evaluate the metadata for the files to identify files that have not been virus scanned. The application could exclude from the transfer files that have not been virus scanned. In the event a user selects the radio button for the password protection field 512, a generated filter file (e.g., the filter file 212) will include a rule that only allows files that have been virus scanned to be transferred to a destination folder (e.g., the destination folder 208). In the event a group of files for transfer to the destination folder includes a particular file that has not been virus scanned as specified by the rule, the filter file 212 and application (e.g., the computer program 210) performing the file transfer would prevent the particular file from being transferred. For example, the files for transfer could include metadata that indicates whether the respective files are protected by passwords, and the application could evaluate the metadata for the files to identify files that have not been password protected. The application could exclude from the transfer files that have not been password protected.

The exemplary graphical user interface 500 also includes a date created field 514 in which a user can select a range of dates in which files were created and a date modified field 516 in which a user can select a range of dates in which files were modified. In various embodiments, a user could enter dates into the fields. In other embodiments, a user could select dates from drop-down menus, for example. Only files that are created or modified within the range of dates provided in the date created field 514 and/or the date modified field 516 can be transferred. In the event a user selects a dates in the date created field 514, a generated filter file (e.g., the filter file 212) will include a rule that defines a range of creation dates for files that can be transferred to a destination folder (e.g., the destination folder 208). In at least one embodiment, the range of dates could be a single date (e.g., the "start" date and "end" date would be the same). In the event a group of files for transfer to the destination folder includes a particular file having creation date that is outside of the range of dates specified by the rule, the filter file 212 and application (e.g., the computer program 210) performing the file transfer would prevent the particular file from being transferred. For example, the files for transfer could include metadata that indicates a creation date, and the application could evaluate the metadata for the files to identify files that created outside of the range of dates specified by the rule. The application could exclude from the transfer files that are not compliant with the specified dates. In the event a user selects a date in the date modified field 516, a generated filter file (e.g., the filter file 212) will include a rule that defines a range of modification dates for files that can be transferred to a destination folder (e.g., the destination folder 208). In at least one embodiment, the range of dates could be a single date (e.g., the "start" date and "end" date would be the same). In the event a group of files for transfer to the destination folder includes a particular file having modification date that is outside of the range of dates specified by the rule, the filter file 212 and application (e.g., the computer program 210) performing the file transfer would prevent the particular file from being transferred. For example, the files for transfer could include metadata that indicates a modification date, and the application could evaluate the metadata for the files to identify files that were created outside of the range of dates specified by the rule. The identified files are then excluded from the transfer.

The graphical user interface 500 can also include a "file created by" field 518 in which the user can select a file creator. For example, the user could enter the name of a person who created the files. In many business operations, individual employees are associated with a computer network name. When an individual employee creates a file and stores it on a computer of the computer network, the individual employee's computer network name is associated with the file as the creator of the file. The graphical user interface 500 could access a directory of the computer network names for employees and provide a drop-down menu that the user can use to select the computer network name for a particular employee who would have created the files. Only files that are created by the person identified in the file created by field 518 can be transferred. In the event a user inputs a name or names of a file creator in the "file created by" 518, a generated filter file (e.g., the filter file 212) will include a rule that identifies creators for files that can be transferred to a destination folder (e.g., the destination folder 208). In the event a group of files for transfer to the destination folder includes a particular file having a creator that is not identified by the rule, the filter file 212 and application (e.g., the computer program 210) performing the file transfer would prevent the particular file from being transferred. For example, the files for transfer could include metadata that indicates a creator of the file, and the application could evaluate the metadata for the files to identify files that do not have a creator identified by the rule. The application could exclude from the transfer files that are not compliant with the rule.

The graphical user interface 500 also includes a permissions field 520. The permissions field 520 can include a first radio button that a user can select such that only files that are set with the permission for read-only (i.e., the files cannot be overridden or modified) can be transferred. The permissions field 520 can also include a second radio button the user can select such that only files that are set with access permissions can be transferred. For example, permissions could be set up such that only a particular user or a particular group of users (e.g., employees of an information technology group) can access the file. In the event a user selects one or both of the radio buttons for the permissions field 520, a generated filter file (e.g., the filter file 212) will include a rule that only allows files that have the correct permissions transferred to a destination folder (e.g., the destination folder 208). In the event a group of files for transfer to the destination folder includes a particular file that does not have the permissions specified by the rule, the filter file 212 and application (e.g., the computer program 210) performing the file transfer would prevent the particular file from being transferred. For example, the files for transfer could include metadata that indicates permissions for the respective files, and the application could evaluate the metadata for the files to identify files that do not have the permissions specified by the rules. The application could exclude from the transfer files that do not have the correct permissions.

The exemplary fields in the graphical user interface 500 are provided nearly for illustration. Additional fields that establish the rules for a filter file our contemplated herein. A user using the graphical user interface 502 provide user inputs for rules could select any and/or all of the fields to prepare a particular filter file. For example, a user can specify a minimum file size file size field but at a maximum file size. As another example, a user may leave one or more fields blank, that knows would be established with respect to that field. After the user has filled in the appropriate fields for rules for a particular filter file, the filter file can be created. In various aspects, a unique ID, such as a timestamp, MAC ID for the computer the filter file was created, and/or a user ID for the user that created the filter file, could be included with the filter file. As discussed above, in various embodiments, copies of the filter file stored on a portable storage device 230 and in the computer memory 206 could be compared with one another to ensure that they are identical. In at least one embodiment, the unique IDs associated with the copies of the filter files could be compared.

Figure 6:
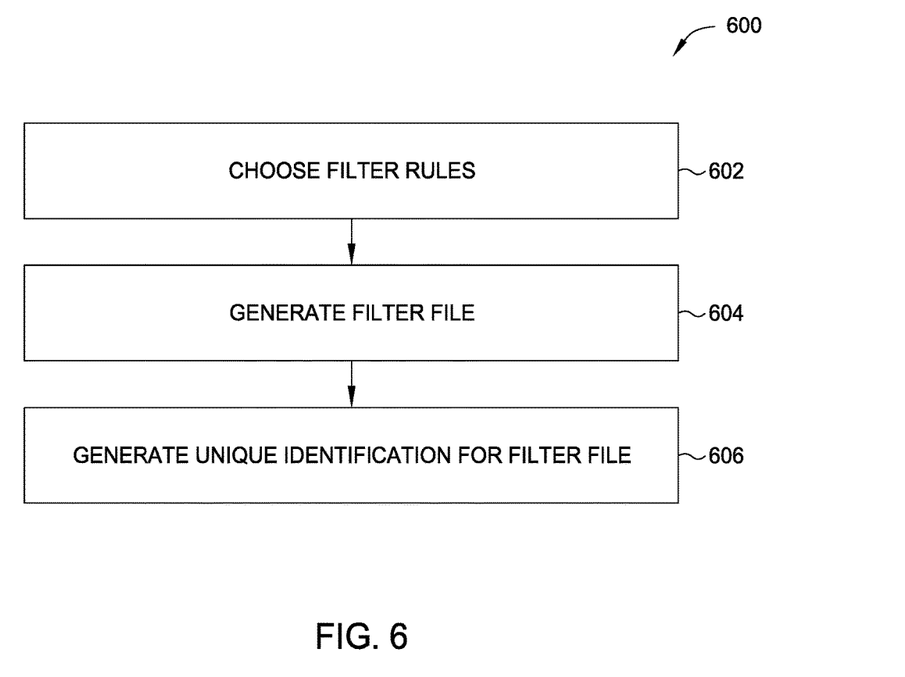
FIG. 6 is a flow chart for a process for generating a filter file based on rules input by a user.

FIG. 6 illustrates a process 604 generating a filter file. In block 602, rules are chosen for the filter file, as discussed above with reference to FIG. 5. In block 604, the filter file is generated that includes the various rules. In block 606, a unique identification can be optionally created and associated with the filter file.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the filtering application, such as the computer program 210) or related data available in the cloud. For example, the computer program 210 could execute on a computing system in the cloud and compare files for transfer to the destination folder 208 with the filter file 212.

While the foregoing is directed to embodiments of the present invention, other and further embodiments of the invention may be devised without departing from the basic scope thereof, and the scope thereof is determined by the claims that follow.

What is claimed is:

1. A system, comprising:
    a computer processor;
    an input operable to receive computer-readable files and computer-readable folders;
    a computer memory containing:
        a destination folder, on a first filesystem, for at least one computer-readable computer file;
        a program that, when executed on the computer processor, performs an operation for processing data, comprising:
            receiving a first copy of a computer-readable filter file that includes at least one rule specific to the transfer of files from a source folder on a second filesystem to the destination folder, wherein the first copy of the computer-readable filter file is stored in the destination folder, and wherein a second copy of the computer-readable filter file is stored in the source folder;
            upon comparing the first copy of the computer-readable filter file to the second copy of the computer-readable filter file and determining that the first copy of the computer-readable filter file and the second copy of the computer-readable filter file match, commencing the transfer of the files from the source folder to the destination folder;
            during a file transfer operation to transfer files to the destination folder from the source folder:
                comparing attributes of each file to the at least one rule specific to the transfer of files to the destination folder; and
                comparing each file to the at least one rule specific to the file transfer operation;
            upon attributes of a compared file violating a rule of the at least one rule specific to the transfer of files to the destination folder, preventing, by a software component performing the file transfer option, the transfer of the violating file from the source folder to the destination folder.

2. The system of claim 1, wherein the program performs additional operations for processing data, comprising:
    upon the compared file violating a rule of the at least one rule specific to the transfer of files to the destination folder, outputting an alert message.

3. The system of claim 2, wherein the alert message identifies the rule of the at least one rule specific to the transfer of files to the destination folder that the compared file violates.

4. The system of claim 1, wherein the at least one rule specific to transfer of files to the destination folder includes at least one of:
    a file size rule;
    a file type rule;
    a file virus scan status;
    a file creation date rule;
    a file modification date rule;
    a file name rule;
    a file password control rule;
    a file creator rule;
    a file permissions rule; and
    a file class rule.

5. A computer program product for transferring computer files to a destination folder, the computer program product comprising:
    a non-transitory computer-readable medium having computer-readable program code embodied therewith, the computer-readable program code executable by one or more computer processors to:
        receiving a first copy of a computer-readable filter file that includes at least one rule specific to a transfer of files from a source folder on a first filesystem to a destination folder on a second filesystem, wherein the first copy of the computer-readable filter file is stored in the source folder, and wherein a second copy of the computer-readable filter file is stored in the destination folder;
        upon comparing the first copy of the computer-readable filter file to the second copy of the computer-readable filter file and determining that the first copy of the computer-readable filter file and the second copy of the computer-readable filter file match, commencing the transfer of the files from the source folder to the destination folder;
        during a file transfer operation to transfer files to the destination folder:
            compare attributes of each file to the at least one rule specific to the transfer of files to the destination folder; and
            compare each file to the at least one rule specific to the file transfer operation;
        upon attributes of a compared file violating a rule of the at least one rule specific to the transfer of files to the destination folder, prevent, by a software component performing the file transfer option, the transfer of the violating file from the source folder to the destination folder.

6. The computer program product of claim 5, wherein the computer-readable program code is further executable to:
   receive at least one user input related to the at least one rule specific to a transfer of files to the destination folder on the destination computer system;
   generate the filter file, wherein the filter file includes the least one rule specific to the transfer of files to the destination folder.

7. The computer program product of claim 5, wherein the computer-readable program code is further executable to:
   upon the compared file violating a rule of the at least one rule specific to the transfer of files to the destination folder, output an alert message.

8. The computer program product of claim 7, wherein the alert message identifies the rule of the at least one rule specific to the transfer of files to the destination folder that the compared file violates.

* * * * *